United States Patent
Tsan (10) Patent No.: US 8,170,325 B2
(45) Date of Patent: May 1, 2012

(54) IMAGE INSPECTING DEVICE AND METHOD FOR A HEAD-MOUNTED DISPLAY

(75) Inventor: Shu Mei Tsan, Tainan County (TW)

(73) Assignee: Himax Display, Inc., Tainan County (TW)

( * ) Notice: Subject to any disclaimer, the term of this patent is extended or adjusted under 35 U.S.C. 154(b) by 1342 days.

(21) Appl. No.: 11/770,228

(22) Filed: Jun. 28, 2007

(65) Prior Publication Data

US 2008/0002859 A1    Jan. 3, 2008

(30) Foreign Application Priority Data

Jun. 29, 2006 (TW) ................. 95123534 A (51) Int. Cl.
G06K 9/00 (2006.01)
(52) U.S. Cl. ............. 382/154; 382/294; 359/201.1; 359/201.2; 359/487.04
(58) Field of Classification Search ........... 382/154, 382/294; 359/201.1, 201.2, 487.04
See application file for complete search history.

(56) References Cited

U.S. PATENT DOCUMENTS

| | | | | |
|---|---|---|---|---|
| 3,251,933 A * | 5/1966 | Beste | | 348/49 |
| 3,670,097 A * | 6/1972 | Jones | | 348/49 |
| 4,743,964 A * | 5/1988 | Allard et al. | | 348/52 |
| 4,805,988 A * | 2/1989 | Dones | | 359/471 |
| 4,994,794 A * | 2/1991 | Price et al. | | 345/7 |
| 5,035,474 A * | 7/1991 | Moss et al. | | 359/13 |
| 5,198,928 A * | 3/1993 | Chauvin | | 359/465 |
| 5,392,158 A * | 2/1995 | Tosaki | | 359/633 |
| 5,581,271 A * | 12/1996 | Kraemer | | 345/8 |
| 5,726,670 A * | 3/1998 | Tabata et al. | | 345/7 |
| 5,739,955 A * | 4/1998 | Marshall | | 359/631 |
| 5,801,760 A * | 9/1998 | Uomori | | 348/47 |
| 6,094,309 A * | 7/2000 | Ophey | | 359/630 |
| 6,191,809 B1 * | 2/2001 | Hori et al. | | 348/45 |
| 6,417,820 B1 * | 7/2002 | Choi | | 345/8 |
| 6,525,878 B1 * | 2/2003 | Takahashi | | 359/466 |
| 6,545,741 B2 * | 4/2003 | Meltzer | | 352/62 |
| 6,751,020 B2 * | 6/2004 | Sugawara | | 359/462 |
| 6,813,085 B2 * | 11/2004 | Richards | | 359/630 |
| 7,040,759 B2 * | 5/2006 | Chernyak et al. | | 351/246 |
| 7,167,314 B2 * | 1/2007 | Lerner et al. | | 359/629 |
| 7,457,041 B2 * | 11/2008 | Tsan et al. | | 359/630 |
| 7,559,653 B2 * | 7/2009 | Silverstein | | 353/7 |
| 2001/0015753 A1 * | 8/2001 | Myers | | 348/51 |
| 2001/0019450 A1 * | 9/2001 | Ogino | | 359/462 |
| 2001/0030715 A1 * | 10/2001 | Tabata | | 349/15 |
| 2002/0034004 A1 * | 3/2002 | Khoshnevis et al. | | 359/407 |
| 2002/0105484 A1 * | 8/2002 | Navab et al. | | 345/8 |
| 2002/0118273 A1 * | 8/2002 | Chandra | | 348/42 |
| 2003/0133079 A1 * | 7/2003 | Cobb | | 353/31 |
| 2004/0145539 A1 * | 7/2004 | Okamoto et al. | | 345/8 |
| 2004/0150888 A1 * | 8/2004 | Domjan et al. | | 359/630 |
| 2005/0083248 A1 * | 4/2005 | Biocca et al. | | 345/8 |
| 2005/0128438 A1 * | 6/2005 | Kang et al. | | 353/69 |
| 2006/0168859 A1 * | 8/2006 | Pombo et al. | | 40/611.07 |
| 2006/0198027 A1 * | 9/2006 | Li et al. | | 359/630 |

OTHER PUBLICATIONS

Fast calibration—reality, Fuhrmann et al., ACM 1-58113-141,1999, pp. 166-167.*
Calibration—systems, Hua et al., IEEE, 0-7695-1781-1,2002, pp. 1-10.*

\* cited by examiner

*Primary Examiner* — Jayesh A Patel (57) ABSTRACT

An image inspecting device is adapted to inspect the difference value between the locations of first and second images. The image inspecting device includes an image catching unit and a light processing unit. The light processing unit is adapted to project the first and second images on the image catching unit.

14 Claims, 8 Drawing Sheets

IMAGE INSPECTING DEVICE AND METHOD FOR A HEAD-MOUNTED DISPLAY

CROSS REFERENCE TO RELATED APPLICATION

This application claims the priority benefit of Taiwan Patent Application Serial Number 095123534, Jun. 29, 2006, the full disclosure of which is incorporated herein by reference.

BACKGROUND OF THE INVENTION

1. Field of the Invention

The present invention generally relates to image inspecting device and method, and more particularly to an image inspecting device for a head mounted display, wherein the image inspecting device is used for quantifying the degree of the combined binocular images or quantifying the degree of the positioned binocular image.

2. Description of the Related Art

A head mounted display (HMD) is an optical visualizing apparatus that utilizes displaying devices positioned so as to display a virtual image in front of the users' eyes. The head mounted display (HMD) is broadly used for the virtual reality (VR) as a frontier technology. The HMD is not only the standard equipment for the virtual reality, but also can replace the display of a computer or a television. For example, when a user uses a notebook computer at a public place and the user doesn't want other people to peep at the display of the notebook computer, the HMD can be a better solution to this situation. In addition, many movable workers, e.g. researchers at the laboratory, must fulfill their tasks by means of the head mounted display.

Furthermore, the monocular HMD is different from the binocular HMD and can assist the user in browsing the image on the screen by means of one eye, and the user can still do other thing by the other eye.

Figure 1:
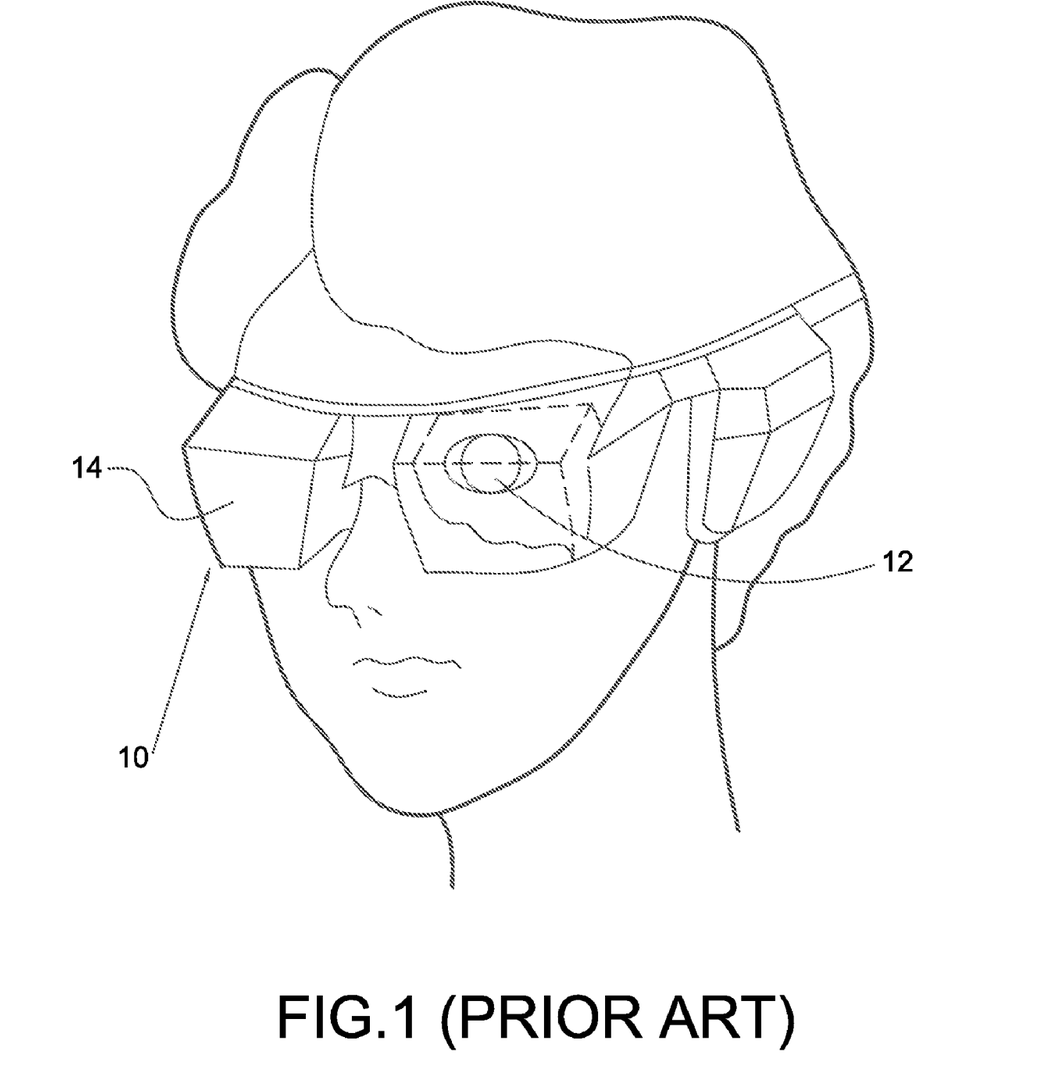
FIG. 1 is a perspective schematic view of a head mounted display (HMD) in the prior art, showing that the prior art utilizes human eyes to judge the degree of combined binocular images of the binocular HMD.

Referring FIG. 1, the monocular HMD (not shown) or binocular HMD 10 include one or two optical engines 14 (i.e. micro-displays), which are not easily and successfully assembled. Currently, there is no image inspecting device to identify the combination of binocular images after the binocular HMD 10 is assembled or to identify the positioning of monocular image after the monocular HMD is assembled. Thus, there are only human eyes to judge the combination of binocular images or monocular image.

However, the prior art utilizes human eyes to judge the degree of combined binocular images of the binocular HMD or the degree of positioned monocular image of the monocular HMD, but the prior art cannot quantify the degree of the combined binocular images or the positioned monocular image. Thus, the prior art cannot quickly judge whether the HMD to be inspected must be adjusted or calibrated again.

Accordingly, there exists a need for an image inspecting device capable of solving the above-mentioned problems.

SUMMARY OF THE INVENTION

It is an object of the present invention to provide an image inspecting device for quantifying the degree of the combined binocular images.

It is another object of the present invention to provide an image inspecting device for quantifying the degree of the positioned monocular image.

In order to achieve the foregoing objects, the present invention provides an image inspecting device adapted to inspect the difference value between locations of first and second images. The image inspecting device includes an image catching unit and a light processing unit. The light processing unit is adapted to project the first and second images on the image catching unit.

According to the image inspecting device of the present invention, the difference value between the locations of the first and second images on the image catching unit is processed so as to acquire the result of the combined binocular images, thereby quantifying the degree of the combined binocular images. Compared with the prior art, the image inspecting method of the present invention can quickly judge whether the inspection of image is failed or not, i.e. the above-mentioned image inspecting method can quickly judge whether the head mounted display (i.e. HMD is to be inspected) must be adjusted or calibrated again, by comparing the difference value between the locations of the two images of the HMD (to be inspected) with the predetermined difference value between the locations of the two images.

The present invention further provides an image inspecting device adapted to inspect the difference value between locations of a real image and a preset image. The image inspecting device includes an image catching unit, a light processing unit and a memory. The light processing unit projects the real image on the image catching unit. The memory is stored with a location of the preset image on the image catching unit.

According to the image inspecting device of the present invention, the difference value between the locations of the real and preset images on the image catching unit is processed, thereby quantifying the degree of the positioned monocular image. Compared with the prior art, the image inspecting method of the present invention can quickly judge whether the inspection of image is failed or not, i.e. the above-mentioned image inspecting method can quickly judge whether the monocular HMD (to be inspected) must be adjusted or calibrated again, by comparing the difference value between the locations of the real and preset images of the monocular HMD (to be inspected) with the predetermined difference value between the locations of the real and preset images.

The foregoing, as well as additional objects, features and advantages of the invention will be more apparent from the following detailed description, which proceeds with reference to the accompanying drawings.

DETAILED DESCRIPTION OF THE PREFERRED EMBODIMENT

Figure 2:
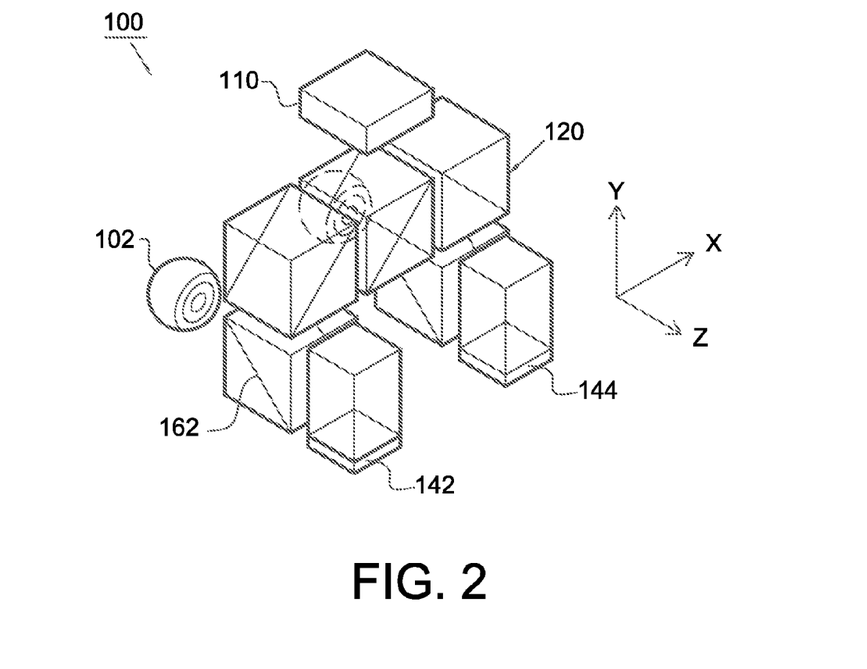
FIG. 2 is a perspective schematic view of an image inspecting device according to the first embodiment of the present invention.

Referring to FIG. 2, it depicts an image inspecting device 100 according to the first embodiment of the present invention for inspecting the difference value between locations of first and second images and defining a XYZ coordinate with three axes being perpendicular each other. The first and second images are generated by two optical engines 142, 144 of a head mounted display (HMD) to be inspected. The image inspecting device 100 includes an image catching unit 110 and a light processing unit 120. The light processing unit 120 projects the first and second images on the image catching unit 110. The image catching unit 110 includes a lens set (not shown) and an image sensor (not shown) of charge coupled device (CCD) or complementary metal-oxide semiconductor (CMOS).

Figure 3:
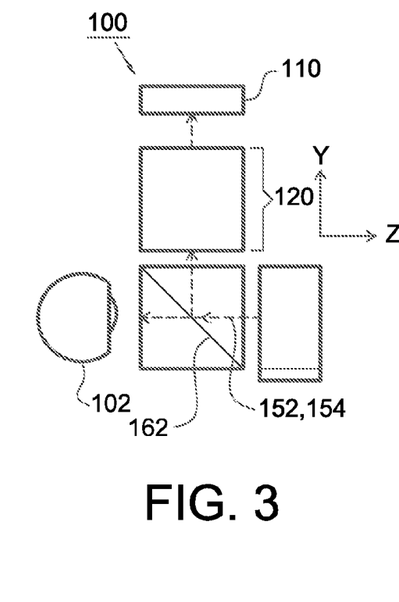
FIG. 3 is a left side elevational schematic view of the image inspecting device according to the first embodiment of the present invention.

Referring to FIG. 3, the image inspecting device 100 further includes two beam splitting elements 162 for respectively splitting the first and second images 152, 154 generated from the two optical engines 142, 144 to the light processing unit 120 along Y-axis and the human eyes 102 along Z-axis.

Figure 4:
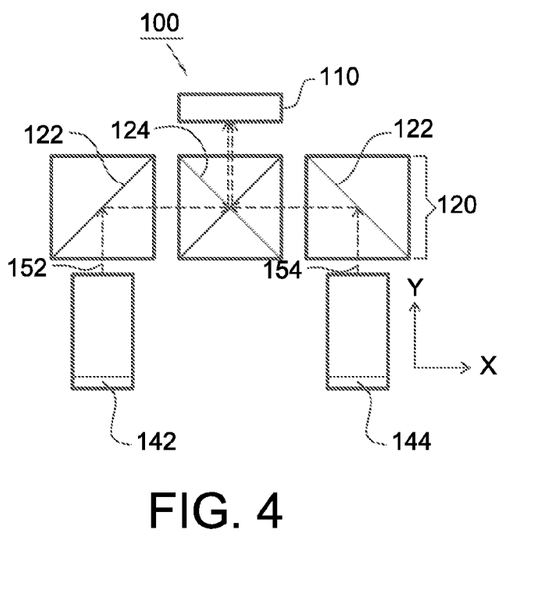
FIG. 4 is a front elevational schematic view of the image inspecting device according to the first embodiment of the present invention.

Referring to FIG. 4, the light processing unit 120 includes two beam splitting elements 122 and a beam combining element 124. The first and second images 152, 154 from the two beam splitting elements 162 are projected on the single image catching unit 110 through the two beam splitting elements 122 and the beam combining element 124. More detailed, the first and second images 152, 154 from the two beam splitting elements 162 enter the two beam splitting elements 122 along Y-axis respectively, then the two beam splitting elements 122 split the first and second images 152, 154 to the beam combining element 124 along X-axis, and finally the beam combining element 124 projects the first and second images 152, 154 on the single image catching unit 110. The beam splitting element 122 can be a polarizing beam splitter (polarizing beam-splitting mirror) or a beam splitter (beam-splitting mirror). The beam combining element 124 can be an X-cube prism.

Figure 5:
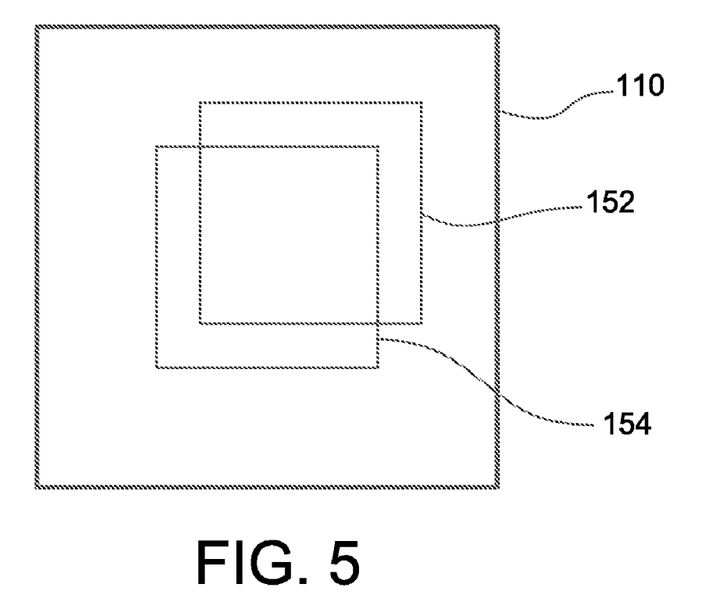
FIG. 5 is a plan schematic view of the image catching unit according to the first embodiment of the present invention, showing that the first and second images are rectangular images.
Figure 6:
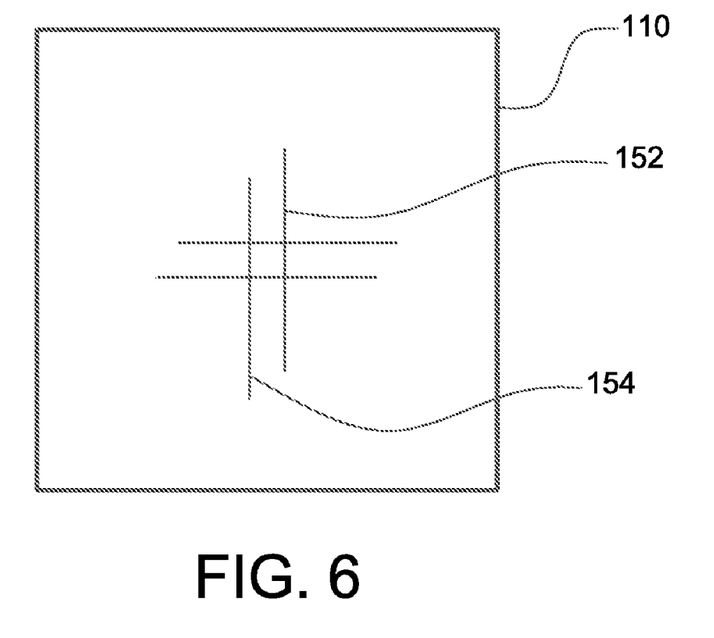
FIG. 6 is a plan schematic view of the image catching unit according to the first embodiment of the present invention, showing that the first and second images are in the shape of a cross.

Referring to FIG. 5, the first and second images 152, 154 are rectangular images. The image inspecting device 100 of the present invention can judge the degree of combined images of the assembled HMD (i.e. HMD is to be inspected) by inspecting the difference value between the locations of the first and second images 152, 154. Preferably, the first and second images 152, 154 can be the first and second color images respectively, wherein the first color image is different from the second color image, e.g. the first and second images 152, 154 can be the red and blue images respectively, whereby the image inspecting device 100 can easily inspect the difference value between the color-mixing locations of first and second images 152, 154 so as to increase the effect of inspection. Otherwise, referring to FIG. 6, the first and second images 152, 154 are in the shape of a cross, whereby the image inspecting device 100 can easily inspect the difference value between the "cross"-shaped locations of the first and second images 152, 154 so as to increase the effect of inspection.

Another HMD (not shown) which has been successfully calibrated can provide the image inspecting device 100 of the present invention with a correct difference value between locations of two images, whereby a predetermined difference value between the locations of the two images in the first manner is set accordingly. The HMD which has been successfully calibrated is called as a golden sample. Otherwise, referring to FIG. 3 again, the image inspecting device 100 respectively splits the first and second images 152, 154 generated from the two optical engines 142, 144 to the light processing unit 120 and the human eyes 102, and the human eyes can provide the image inspecting device 100 of the present invention with an acceptable difference value between locations of two images, whereby another predetermined difference value between the locations of the two images in the second manner is set accordingly. Preferably, the predetermined difference values of the first and second manners can be utilized simultaneously, whereby a further predetermined difference value between the locations of the two images in the third manner is set accordingly.

Regardless of the predetermined difference value in the first, second or third manner, the image inspection is successful when the difference value between the locations of the two images of the HMD (i.e. HMD is to be inspected) is less than the predetermined difference value. In other words, the HMD passes the inspection of the combined images. In addition, the image inspection is failed when the difference value between the locations of the two images of the HMD (i.e. HMD is to be inspected) is more than the predetermined difference value. In other words, the HMD must be adjusted or calibrated again.

According to the image inspecting device 100 in this embodiment, the present invention provides an image inspecting method. Firstly, a head mounted display (HMD) to be inspected is provided, wherein the HMD includes two optical engines 142, 144. An image catching unit 110 and a light processing unit 120 of the image inspecting device 100 are provided. First and second images 152, 154 are generated by the two optical engines 142, 144 of the HMD to be inspected. The first and second images 152, 154 are projected on the image catching unit 110 through the light processing unit 120.

Finally, the difference value between the locations of the first and second images 152, 154 on the image catching unit 110 is inspected. Preferably, the first and second images 152, 154 are set to be the first and second color images respectively, wherein the first color image is different from the second color image, whereby the difference value between the color-mixing locations of the first and second images 152, 154 on the image catching unit 110 is easily inspected. Otherwise, the first and second images 152, 154 are set to be in the shape of a cross, whereby the difference value between the "cross"-shaped locations of first and second images 152, 154 is easily inspected.

According to the image inspecting device of the present invention, the difference value between the locations of the first and second images on the image catching unit is processed so as to acquire the result of the combined binocular images, thereby quantifying the degree of the combined binocular images. Compared with the prior art, the image inspecting method of the present invention can quickly judge whether the inspection of image is failed or not, i.e. the above-mentioned image inspecting method can quickly judge whether the HMD (to be inspected) must be adjusted or calibrated again, by comparing the difference value between the locations of the two images of the HMD (to be inspected) with the predetermined difference value between the locations of the two images.

Figure 7:
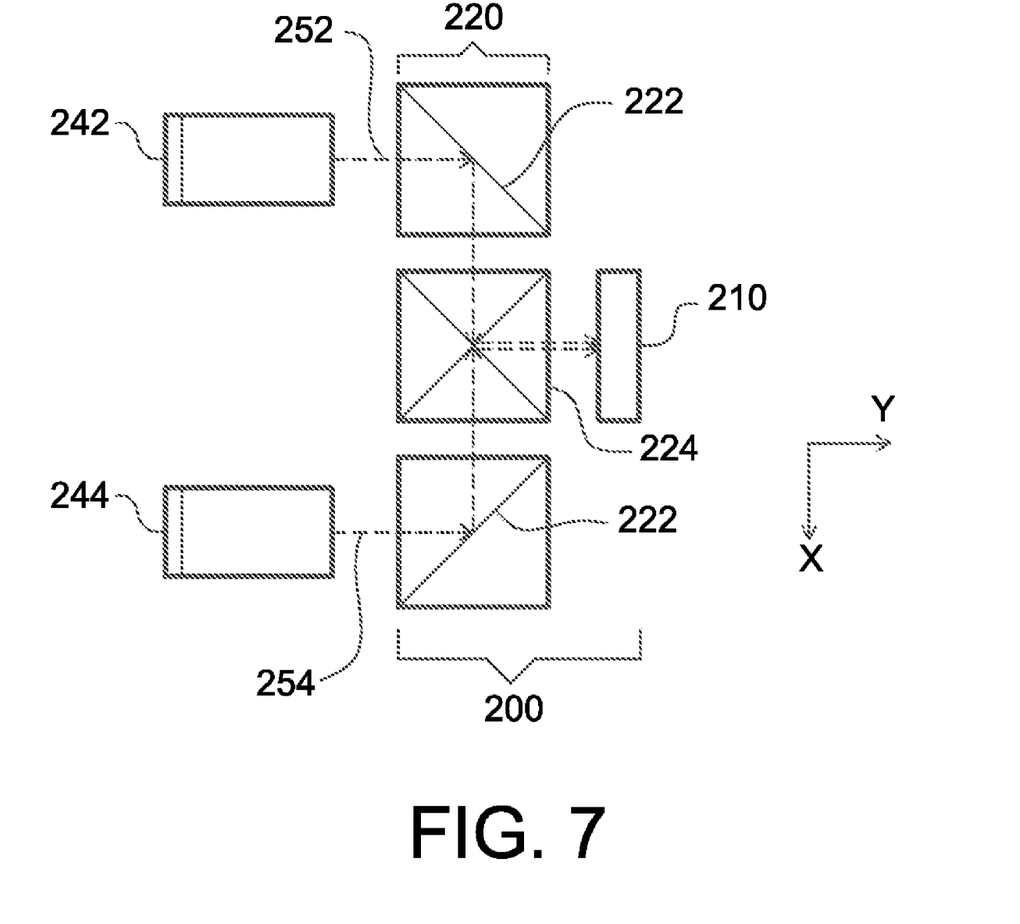
FIG. 7 is a plan schematic view of an image inspecting device according to the second embodiment of the present invention.

Referring to FIG. 7, it depicts an image inspecting device 200 according to the second embodiment of the present invention for inspecting the difference value between locations of first and second images 252, 254 and defining a XY coordinate with two axes being perpendicular each other. The first and second images 252, 254 are generated by two optical engines 242, 244 of a head mounted display (HMD) to be inspected. The image inspecting device 200 in the second embodiment is substantially similar to the image inspecting device 100 in the first embodiment, wherein the similar elements are designated with the similar reference numerals. The image inspecting device 200 includes an image catching unit 210 and a light processing unit 220. The light processing unit 220 projects the first and second images 252, 254 on the single image catching unit 210.

The light processing unit 220 includes two beam splitting elements 222 and a beam combining element 224. The first and second images 252, 254 generated from the two optical engines 242, 244 are respectively projected on the image catching unit 210 through the two beam splitting elements 222 and the beam combining element 224. More detailed, the first and second images 252, 254 from the two optical engines 242, 244 enter the two beam splitting elements 222 along Y-axis respectively, then the two beam splitting elements 222 split the first and second images 252, 254 to the beam combining element 224 along X-axis, and finally the beam combining element 224 projects the first and second images 252, 254 on the single image catching unit 210. The beam splitting element 222 can be a polarizing beam splitter (polarizing beam-splitting mirror) or a beam splitter (beam-splitting mirror). The beam combining element 224 can be an X-cube prism.

The difference between the second embodiment and the first embodiment is characterized in that the image inspecting device 200 in the second embodiment does not require two beam splitting elements 162 described in the first embodiment, i.e. the image inspecting device 200 are not required to split the first and second images 252, 254 generated from the two optical engines 242, 244 to the human eyes. During the calibration of the image inspecting device 200 in the second embodiment, another HMD (not shown) which has been successfully calibrated can provide the image inspecting device 200 with a correct difference value between locations of two images, whereby a predetermined difference value between the locations of the two images is set accordingly. The HMD which has been successfully calibrated is called as a golden sample.

Compared with the first embodiment, the structure of the image inspecting device 200 in the second embodiment is simpler, and the image inspecting device 200 achieves the similar effect, e.g. quantifying the degree of the combined binocular images. Compared with the prior, the image inspecting method of the present invention can quickly judge whether the HMD (to be inspected) must be adjusted or calibrated again, by comparing the difference value between the locations of the two images of the HMD (to be inspected) with the predetermined difference value between the locations of the two images.

Figure 8A:
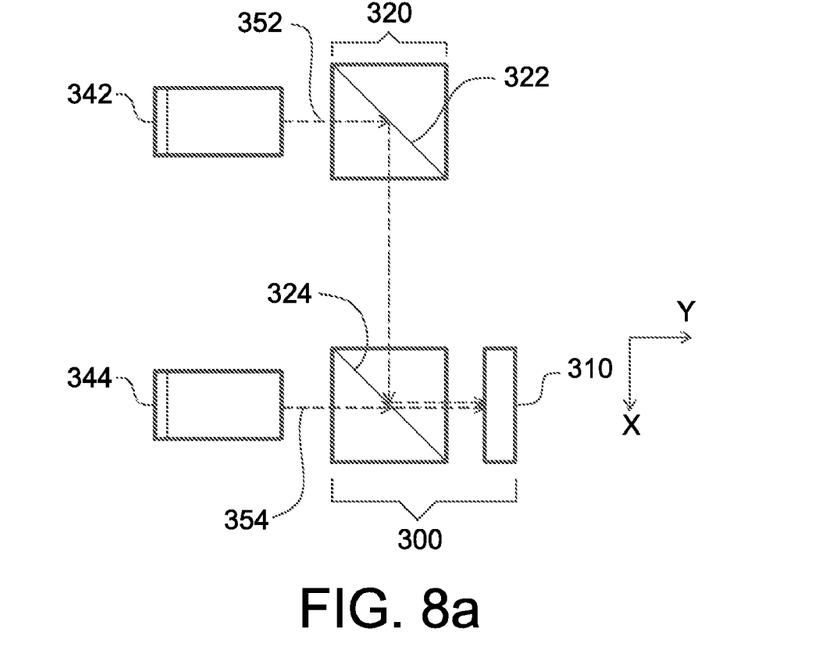
FIG. 8a is a plan schematic view of an image inspecting device according to the third embodiment of the present invention.

Referring to FIG. 8a, it depicts an image inspecting device 300 according to the third embodiment of the present invention for inspecting the difference value between locations of first and second images 352, 354 and defining a XY coordinate with two axes being perpendicular each other. The first and second images 352, 354 are generated by two optical engines 342, 344 of a head mounted display (HMD) to be inspected. The image inspecting device 300 in the third embodiment is substantially similar to the image inspecting device 200 in the second embodiment, wherein the similar elements are designated with the similar reference numerals. The image inspecting device 300 includes an image catching unit 310 and a light processing unit 320. The light processing unit 320 projects the first and second images 352, 354 on the single image catching unit 310.

The light processing unit 320 includes a beam splitting element 322 and a beam combining element 324. The first image 352 spitted by the beam splitting elements 322 enters the beam combining element 324. The first image 352 from the beam splitting elements 322 and the second image 354 are projected on the image catching unit 310 through the beam combining element 324. More detailed, the first image 352 from the optical engine 342 enters the beam splitting elements 322 along Y-axis, then the first image 352 is spitted by the beam splitting elements 322 and enters the beam combining element 324 along X-axis, and finally the beam combining element 324 projects the first image 352 on the single image catching unit 310 along Y-axis; and the second image 354 from the optical engine 344 enters the beam combining element 324 along Y-axis, and then the beam combining element 324 projects the second image 354 on the single image catching unit 310 along Y-axis. The beam splitting element 322 and the beam combining element 324 can be polarizing beam splitters (polarizing beam-splitting mirrors) or beam splitters (beam-splitting mirrors). In order to increase the light efficiency during inspection and let the brightness of the first image 352 on the image catching unit 310 be similar to that of the second image 354 on the image catching unit 310, the ratio of transmission to reflection of the beam splitting element 322 and the beam combining element 324 must be properly selected. For example, if the beam splitting element 322 and the beam combining element 324 are beam splitters (beam-splitting mirrors), the ratio of transmission to reflection of the beam splitters is approximately 40 to 60.

Figure 8B:
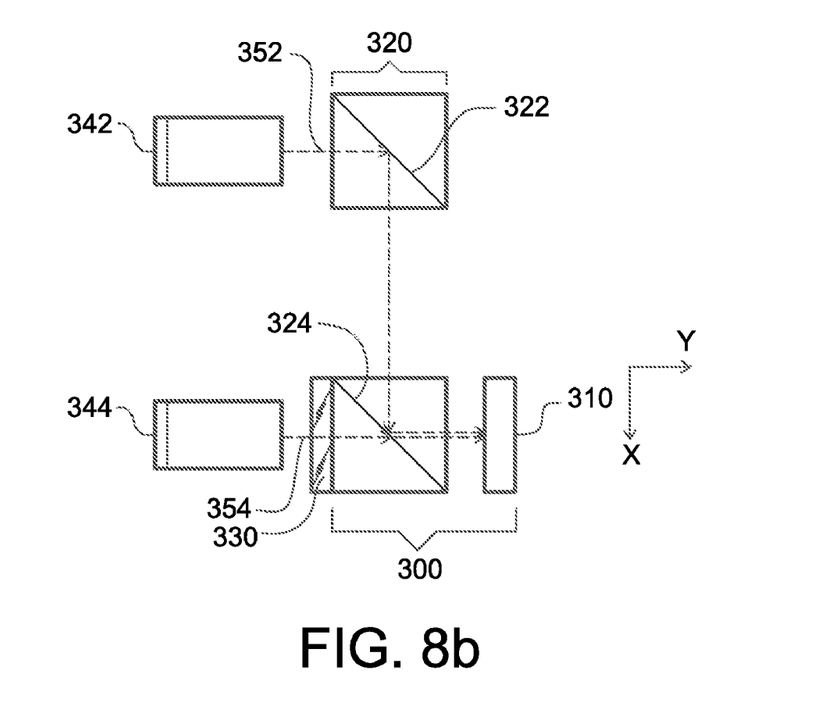
FIG. 8b is a plan schematic view of the image inspecting device according to the third embodiment of the present invention, showing that the light processing unit further includes a brightness adjusting element.

Referring to FIG. 8b, in order to let the brightness of the first image 352 on the image catching unit 310 be similar to that of the second image 354 on the image catching unit 310, the image inspecting device 300 can utilize a brightness adjusting element 330 to adjust the light strength of the second image 354, except the ratio of transmission to reflection of the beam splitting element 322 and the beam combining element 324 can be properly selected. Thus, the brightness adjusting element 330 can be a neutral density filter (NDF), a linear polarizer or a half-wave plate.

Compared with the second embodiment, the structure of the image inspecting device 300 in the third embodiment is simpler, and the image inspecting device 300 can achieves the effect being similar to that of the image inspecting device 200 in the second embodiment.

Figure 9A:
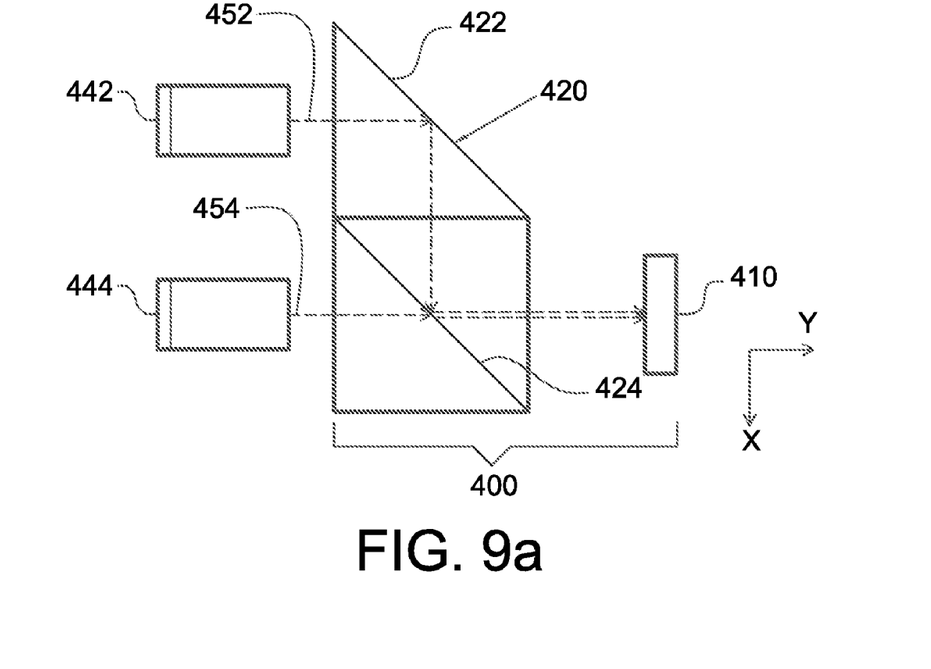
FIG. 9a is a plan schematic view of an image inspecting device according to the fourth embodiment of the present invention.

Referring to FIG. 9a, it depicts an image inspecting device 400 according to the fourth embodiment of the present invention for inspecting the difference value between locations of first and second images 452, 454 and defining a XY coordinate with two axes being perpendicular each other. The first and second images 452, 454 are generated by two optical engines 442, 444 of a head mounted display (HMD) to be inspected. The image inspecting device 400 in the fourth embodiment is substantially similar to the image inspecting device 300 in the third embodiment, wherein the similar elements are designated with the similar reference numerals. The image inspecting device 400 includes an image catching unit 410 and a light processing unit 420. The light processing unit 420 projects the first and second images 452, 454 on the single image catching unit 410.

The light processing unit 420 includes a reflecting mirror 422 and a beam combining element 424. The first image 452 reflected by the reflecting mirror 422 enters the beam combining element 424. The second image 454 directly enters the beam combining element 424. The first image 452 from the reflecting mirror 422 and the second image 454 are projected on the image catching unit 410 through the beam combining element 424. More detailed, the first image 452 from the optical engine 442 enter the reflecting mirror 422 along Y-axis, then the first image 452 is reflected by the reflecting mirror 422 and enters the beam combining element 424 along X-axis, and finally the beam combining element 424 projects the first image 452 on the single image catching unit 410 along Y-axis; and the second image 454 from the optical engine 444 enters the beam combining element 424 along Y-axis, and then the beam combining element 424 projects the second image 454 on the single image catching unit 410 along Y-axis. The beam combining element 424 can be a polarizing beam splitter (polarizing beam-splitting mirrors) or a beam splitter (beam-splitting mirrors). The reflecting mirror 422 can be a polarizing beam splitter (polarizing beam-splitting mirror). In order to increase the light efficiency during inspection and let the brightness of the first image 452 on the image catching unit 410 be similar to that of the second image 454 on the image catching unit 410, the ratio of transmission to reflection of the beam combining element 424 must be properly selected so as to match with the reflectance of the reflecting mirror 422.

Figure 9B:
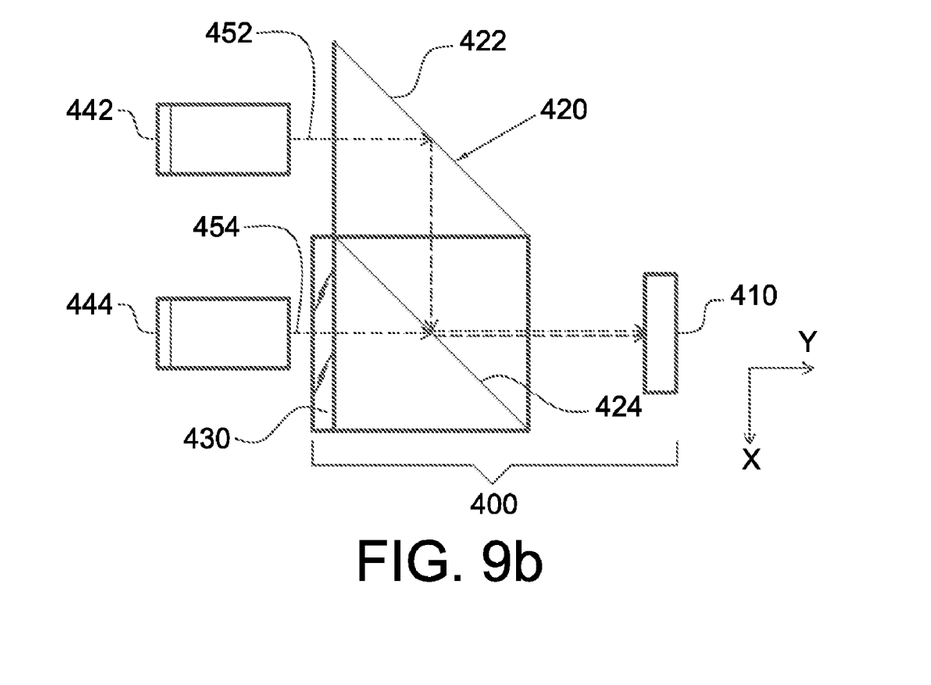
FIG. 9b is a plan schematic view of the image inspecting device according to the fourth embodiment of the present invention, showing that the light processing unit further includes a brightness adjusting element.

Referring to FIG. 9b, in order to let the brightness of the first image 452 on the image catching unit 410 be similar to that of the second image 454 on the image catching unit 410, a brightness adjusting element 430 is disposed between the optical engine 444 and the beam combining element 424 so as to adjust the light strength of the second image 454. Thus, the brightness adjusting element 430 can be a neutral density filter (NDF), a linear polarizer or a half-wave plate.

Compared with the second embodiment, the structure of the image inspecting device 400 in the fourth embodiment is simpler, and the image inspecting device 400 can achieves the effect being similar to that of the image inspecting device 300 in the third embodiment.

Figure 10:
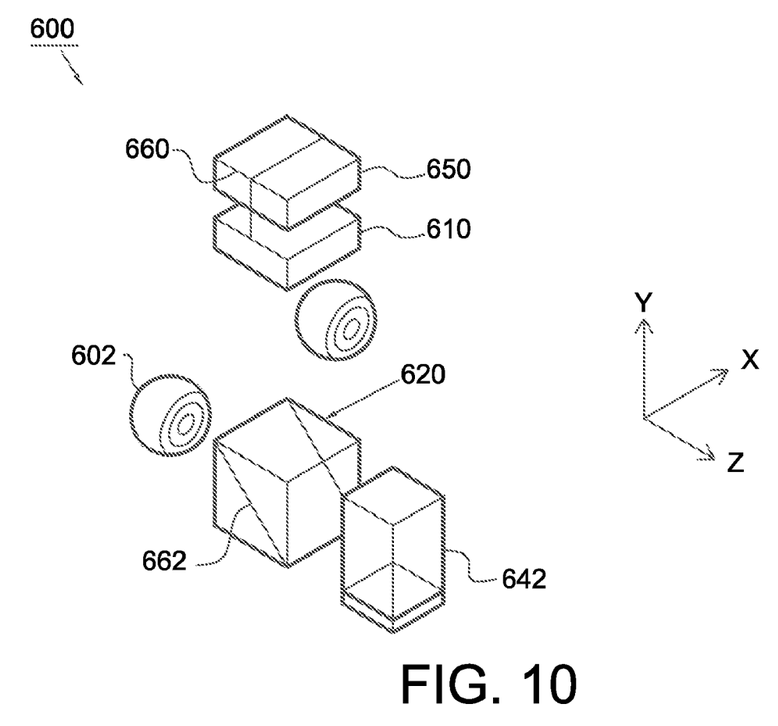
FIG. 10 is a perspective schematic view of an image inspecting device according to the fifth embodiment of the present invention.

Referring to FIG. 10, it depicts an image inspecting device 600 according to the fifth embodiment of the present invention for inspecting the difference value between locations of a real image and a preset image and defining a XYZ coordinate with three axes being perpendicular each other. The real image is generated by an optical engine 642 of a monocular head mounted display (HMD) to be inspected, and the preset image is generated by another monocular HMD (not shown) which has been successfully calibrated. The monocular HMD which has been successfully calibrated is called as a golden sample.

Figure 11:
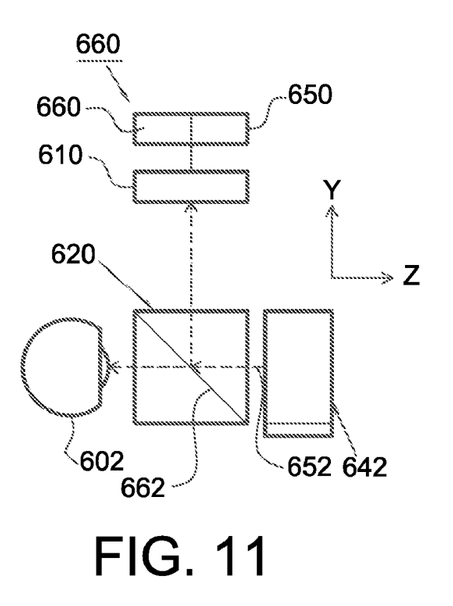
FIG. 11 is a left side elevational schematic view of the image inspecting device according to the fifth embodiment of the present invention.
Figure 12:
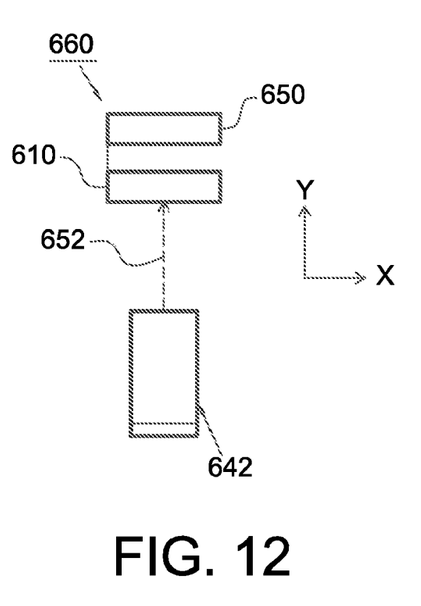
FIG. 12 is a front elevational schematic view of the image inspecting device according to the fifth embodiment of the present invention.

Referring to FIGS. 11 and 12, the image inspecting device 600 includes an image catching unit 610, a light processing unit 620, a memory 650 and a microprocessor 660. The light processing unit 620 projects the real images on the image catching unit 610. The memory 650 is stored with the location of the preset image on the image catching unit 610. The microprocessor 660 inspects the difference value between the locations of the real image 652 and the preset image on the image catching unit 610.

Figure 13:
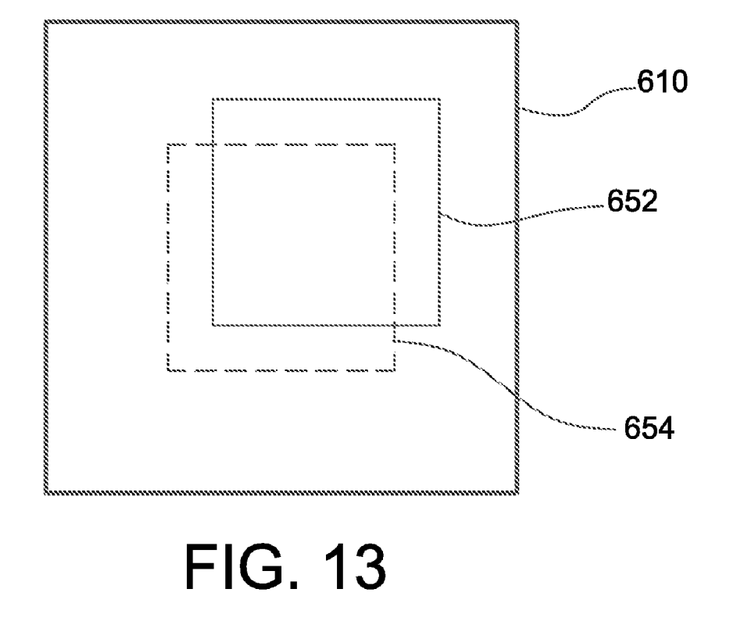
FIG. 13 is a plan schematic view of an image catching unit according to the fifth embodiment of the present invention, showing that the first and second images are rectangular images.
Figure 14:
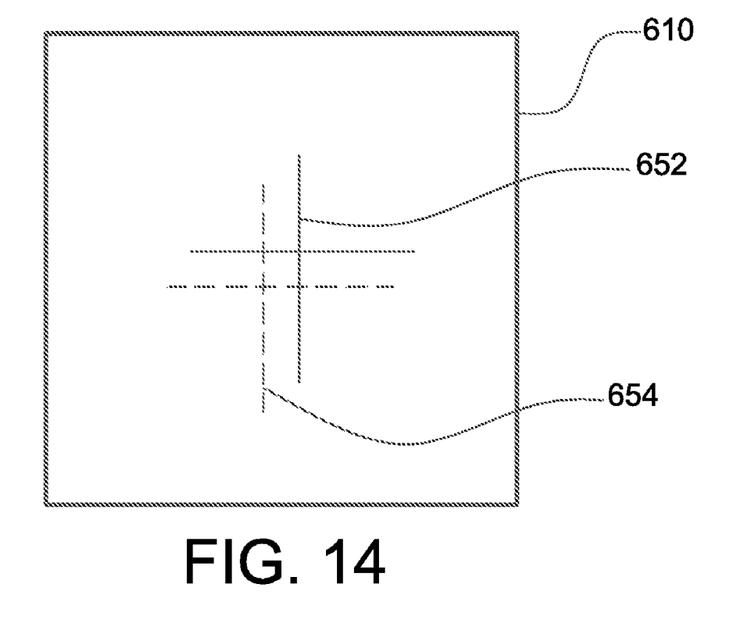
FIG. 14 is a plan schematic view of an image catching unit according to the fifth embodiment of the present invention, showing that the first and second images are in the shape of a cross.

Referring to FIG. 13, the real and preset images 652, 654 are rectangular images. The image inspecting device 600 of the present invention can judge the degree of positioned image of the assembled HMD (i.e. HMD is to be inspected) by inspecting the difference value between the locations of the real and preset images 652, 654. Otherwise, referring to FIG. 14, the real and preset images 652, 654 are in the shape of a cross, whereby the image inspecting device 600 can easily inspect the difference value between the "cross"-shaped locations of the real and preset images 652, 654.

Referring to FIG. 11 again, the light processing unit 620 includes a beam splitting element 662 for splitting the real image 652 generated from the optical engine 642 to the image catching unit 610 along Y-axis and the human eyes 602 along Z-axis, whereby a difference value between locations of the real image 652 and the preset image is accepted by the human eyes, and a predetermined difference value between the locations of the real image 652 and the preset image is set accordingly. The beam splitting element 662 can be a polarizing beam splitter (polarizing beam-splitting mirror) or a beam splitter (beam-splitting mirror).

The image inspection is successful when the difference value between the locations of the real image and the preset image of the monocular HMD (i.e. HMD is to be inspected) is less than the predetermined difference value. In other words, the monocular HMD passes the inspection of the positioned image. In addition, the image inspection is failed when the difference value between the locations of the real image and the preset image of the monocular HMD (i.e. HMD is to be inspected) is more than the predetermined difference value. In other words, the monocular HMD must be adjusted or calibrated again.

According to the image inspecting device 600 in this embodiment, the present invention provides an image inspecting method. Firstly, a monocular head mounted display (HMD) to be inspected is provided, wherein the monocular HMD includes an optical engine 642. An image catching unit 610 and a light processing unit 620 of the image inspecting device 600 are provided. A memory 650 of the image inspecting device 600 is provided, wherein the memory 650 is stored with the location of the preset image 654 on the image catching unit 610. A real image 652 is generated by the optical engine 642 of the monocular HMD to be inspected. The real image 652 is projected on the image catching unit 610 through the light processing unit 620.

Finally, a microprocessor 660 of the image inspecting device 600 is provided, wherein the microprocessor 660 inspects the difference value between the locations of the real image 652 and the preset image 654. Preferably, the real and preset images 652, 654 are set to be in the shape of a cross, whereby the image inspecting device 600 can easily inspect the difference value between the "cross"-shaped locations of the real and preset images 652, 654.

According to the image inspecting device of the present invention, the difference value between the locations of the real and preset images on the image catching unit is processed, thereby quantifying the degree of the positioned monocular image. Compared with the prior art, the image inspecting method of the present invention can quickly judge whether the inspection of image is failed or not, i.e. the above-mentioned image inspecting method can quickly judge whether the monocular HMD (to be inspected) must be adjusted or calibrated again, by comparing the difference value between the locations of the real and preset images of the monocular HMD (to be inspected) with the predetermined difference value between the locations of the real and preset images.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. An image inspecting device adapted to inspect the difference value between locations of first and second images, the image inspecting device comprising:
   two optical engines for generating the first and second images, respectively;
   an image catching unit;
   a light processing unit for projecting the first and second images on the image catching unit, wherein the light processing unit comprises two beam splitting elements and a beam combining element, and the first and second images are projected on the image catching unit through the two beam splitting elements and the beam combining element; and
   two beam splitting elements for respectively splitting the first and second images generated from the two optical engines to the light processing unit and human eyes.

2. The image inspecting device as claimed in claim 1, wherein each beam splitting element is a polarizing beam splitter.

3. The image inspecting device as claimed in claim 1, wherein the beam combining element is an X-cube prism.

4. An image inspecting device adapted to inspect the difference value between locations of first and second images, the image inspecting device comprising:
   two optical engines for generating the first and second images, respectively;
   an image catching unit;
   a light processing unit for projecting the first and second images on the image catching unit, and
   two beam splitting elements for respectively splitting the first and second images generated from the two optical engines to the light processing unit and human eyes, wherein the light processing unit comprises a reflecting mirror and a beam combining element, the first image is projected reflected on the image catching unit through the reflecting mirror and the beam combining element, and the second image is projected on the image catching unit through the beam combining element.

5. The image inspecting device as claimed in claim 4, wherein
   the reflecting mirror is a polarizing beam splitter, and
   the beam combining element is a beam splitter.

6. The image inspecting device as claimed in claim 4, wherein the beam combining element is a polarizing beam splitter.

7. The image inspecting device as claimed in claim 4, wherein
   the light processing unit further comprises a brightness adjusting element, and
   the second image enters the beam combining element through the brightness adjusting element.

8. The image inspecting device as claimed in claim 7, wherein the brightness adjusting element is selected from the group consisting of neutral density filter, linear polarizer and half-wave plate.

9. The image inspecting device as claimed in claim 1, wherein
   the first and second images are the first and second color images, respectively, and
   the first color image is different from the second color image.

10. The image inspecting device as claimed in claim 1, wherein the first and second images are each in the shape of a cross.

11. An image inspecting method, comprising the steps of:
    providing a head mounted display, which includes two optical engines;
    providing an image sensor and a light processing unit;
    generating first and second images by the two optical engines of the head mounted display;
    projecting the first and second images on the image sensor through the light processing unit,
    inspecting a difference value between locations of the first and second images caught on the image sensor; and
    providing another head mounted display which has been successfully calibrated, whereby a predetermined difference value between locations of the two images is set, wherein said another head mounted display which has been successfully calibrated is a golden sample.

12. The image inspecting method as claimed in claim 11, further comprising the step of:
    respectively splitting the first and second images generated from the two optical engines to the light processing unit and the human eyes, whereby another predetermined difference value between locations of the two images is set.

13. The image inspecting method as claimed in claim 11, further comprising the steps of:
    setting the image inspection to be successful when the difference value between the locations of the first and second images is less than the predetermined difference value; and
    setting the image inspection to be failed when the difference value between the locations of the first and second images is more than the predetermined difference value.

14. The image inspecting device as claimed in claim 1, wherein the image catching unit is an image sensor.

* * * * *